(12) United States Patent
Suzuki et al.

(10) Patent No.: US 11,536,961 B2
(45) Date of Patent: Dec. 27, 2022

(54) PROCESS DISPLAY SYSTEM, DISPLAY TERMINAL, PROCESS MANAGEMENT APPARATUS, AND NON-TRANSITORY COMPUTER READABLE MEDIUM

(71) Applicant: FUJIFILM BUSINESS INNOVATION CORP., Tokyo (JP)

(72) Inventors: Kodai Suzuki, Kanagawa (JP); Ami Kanzaki, Kanagawa (JP); Kei Arakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 139 days.

(21) Appl. No.: 16/839,407

(22) Filed: Apr. 3, 2020

(65) Prior Publication Data
US 2021/0063740 A1    Mar. 4, 2021

(30) Foreign Application Priority Data

Aug. 30, 2019  (JP) .............................. JP2019-158716

(51) Int. Cl.
*G02B 27/01* (2006.01)
*G06T 7/00* (2017.01)
*G06V 20/20* (2022.01)

(52) U.S. Cl.
CPC .......... *G02B 27/017* (2013.01); *G06T 7/0004* (2013.01); *G06V 20/20* (2022.01); *G02B 2027/0138* (2013.01); *G02B 2027/0141* (2013.01); *G06T 2207/30164* (2013.01)

(58) Field of Classification Search
CPC .......... G02B 27/017; G02B 2027/0138; G02B 2027/0141; G02B 2027/014; G06K 9/00671; G06T 7/0004; G06T 2207/30164; G06F 3/011; G06F 3/121; G06F 3/1229; G06F 3/1259; G06F 3/1288; G06F 3/1292; G06F 3/1207; G06Q 10/06316
See application file for complete search history.

(56) References Cited

U.S. PATENT DOCUMENTS

| 2013/0169654 | A1* | 7/2013 | Kim ....................... G09G 5/003 345/520 |
| 2016/0219159 | A1* | 7/2016 | Iezaki ................... G06F 3/1234 |
| 2018/0307045 | A1  | 10/2018 | Nishi |
| 2020/0319830 | A1* | 10/2020 | Kaneda ................. G06F 3/1222 |

FOREIGN PATENT DOCUMENTS

| JP | 2010-191663 A | 9/2010 |
| JP | 2017-182487 A | 10/2017 |
| JP | 2018-181232 A | 11/2018 |

* cited by examiner

*Primary Examiner* — Amit Chatly
(74) *Attorney, Agent, or Firm* — Oliff PLC

(57) ABSTRACT

A process display system includes a display terminal including a first processor and a process management system that includes a second processor and that communicates with the display terminal. The first processor or the second processor performs control of whether to update display of process information regarding a process. The process information is displayed by the display terminal. The control is performed on a basis of a change level of the process information on the display terminal.

17 Claims, 6 Drawing Sheets

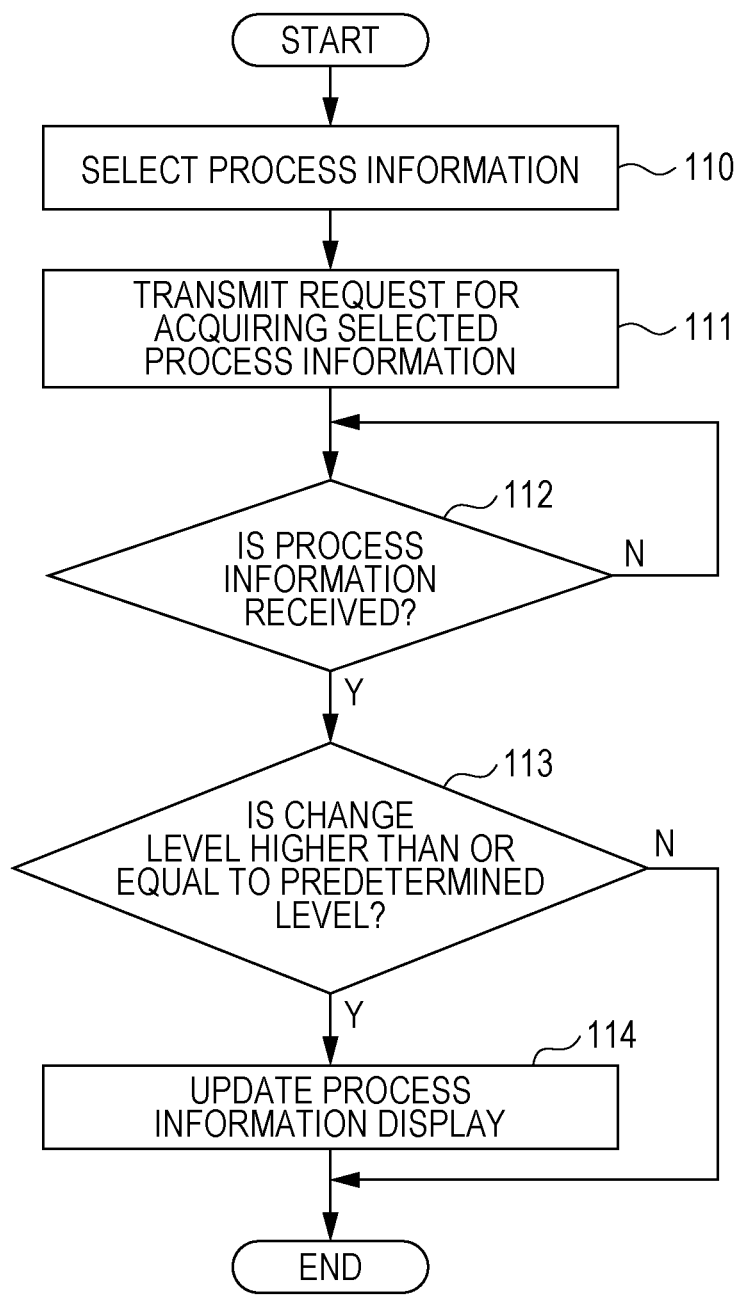

PROCESS DISPLAY SYSTEM, DISPLAY TERMINAL, PROCESS MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-158716 filed Aug. 30, 2019.

BACKGROUND (i) Technical Field

The present disclosure relates to a process display system, a display terminal, a process management apparatus, and a non-transitory computer readable medium.

(ii) Related Art

For example, Japanese Unexamined Patent Application Publication No. 2018-181232 describes a maintenance support apparatus that extracts operating states of factory facilities and that displays, on a head mounted display including a display and an imaging unit, maintenance information for a factory facility judged to have an abnormality occurrence. The display displays an augmented reality image in which an additional image is superimposed on the real scene. The imaging unit captures the image of the real scene and acquires a real image. The maintenance support apparatus includes an image analysis unit that extracts information indicating the operating state of each factory facility on the basis of the real image acquired by the imaging unit of the head mounted display. The maintenance support apparatus further includes a data memory and a data analysis unit. The data memory stores information indicating the operating state extracted by the image analysis unit. The data analysis unit judges whether an abnormality occurs on the factory facility on the basis of the information stored in the data memory and indicating the operating state. The maintenance support apparatus further includes a display controller that causes the display of the head mounted display to display an augmented reality image in which an additional image representing maintenance information for the factory facility judged to have an abnormality by the data analysis unit is superimposed on the real scene.

Japanese Unexamined Patent Application Publication No. 2017-182487 describes a system including a head mounted apparatus and an information processing apparatus. The information processing apparatus includes a first communication unit that communicates with the head mounted apparatus and a judgment unit that judges whether information indicating an abnormal state in conjunction with an apparatus or a job associated with the head mounted apparatus is detected. The first communication unit transmits information indicating the result of the detection judgment by the judgment unit to the head mounted apparatus. The head mounted apparatus includes a display and a second communication unit that communicates with the information processing apparatus. The second communication unit receives the judgment result transmitted by the information processing apparatus. The display displays information indicating the judgment result received by the second communication unit.

Japanese Unexamined Patent Application Publication No. 2010-191663 describes a network management system including multiple clients that manage network apparatuses under the control of and in cooperation with a server. When receiving network apparatus state information indicating the state of a network apparatus from the network apparatus, the server judges, on the basis of the occurrence frequency and the priority, whether to directly transmit the network apparatus state information to all of the clients or to transmit the network apparatus state information to only some of the clients for an instruction to transfer the network apparatus state information to the other clients.

SUMMARY

When a process is managed, the process management is supported in some cases by displaying information regarding the process on a display terminal such as a xR device (MR: mixed reality; VR: virtual reality; and AR: augmented reality) connected to a process management apparatus. The display terminal updates the information in synchronization with the acquirement of the information regardless of whether the information regarding the process is changed. However, display terminals have limited resources in comparison with general personal computers (PCs), and some display terminals operate slowly when display is updated. Accordingly, updating information display on each display terminal every time the information is changed makes it difficult to manage the process smoothly.

Aspects of non-limiting embodiments of the present disclosure relate to a process display system, a display terminal, a process management apparatus, and a non-transitory computer readable medium that are enabled to reduce the number of times in which the display terminal updates display.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a process display system including a display terminal including a first processor and a process management system that includes a second processor and that communicates with the display terminal. The first processor or the second processor performs control of whether to update display of process information regarding a process. The process information is displayed by the display terminal. The control is performed on a basis of a change level of the process information on the display terminal.

BRIEF DESCRIPTION OF THE DRAWINGS

Exemplary embodiments of the present disclosure will be described in detail based on the following figures, wherein:

FIG. 7 is a flowchart illustrating an example flow of processing performed executed in accordance with a process display program according to the second exemplary embodiment.

DETAILED DESCRIPTION

Hereinafter, an example of a mode for implementing the present disclosure will be described in detail with reference to the drawings.

First Exemplary Embodiment

Figure 1:
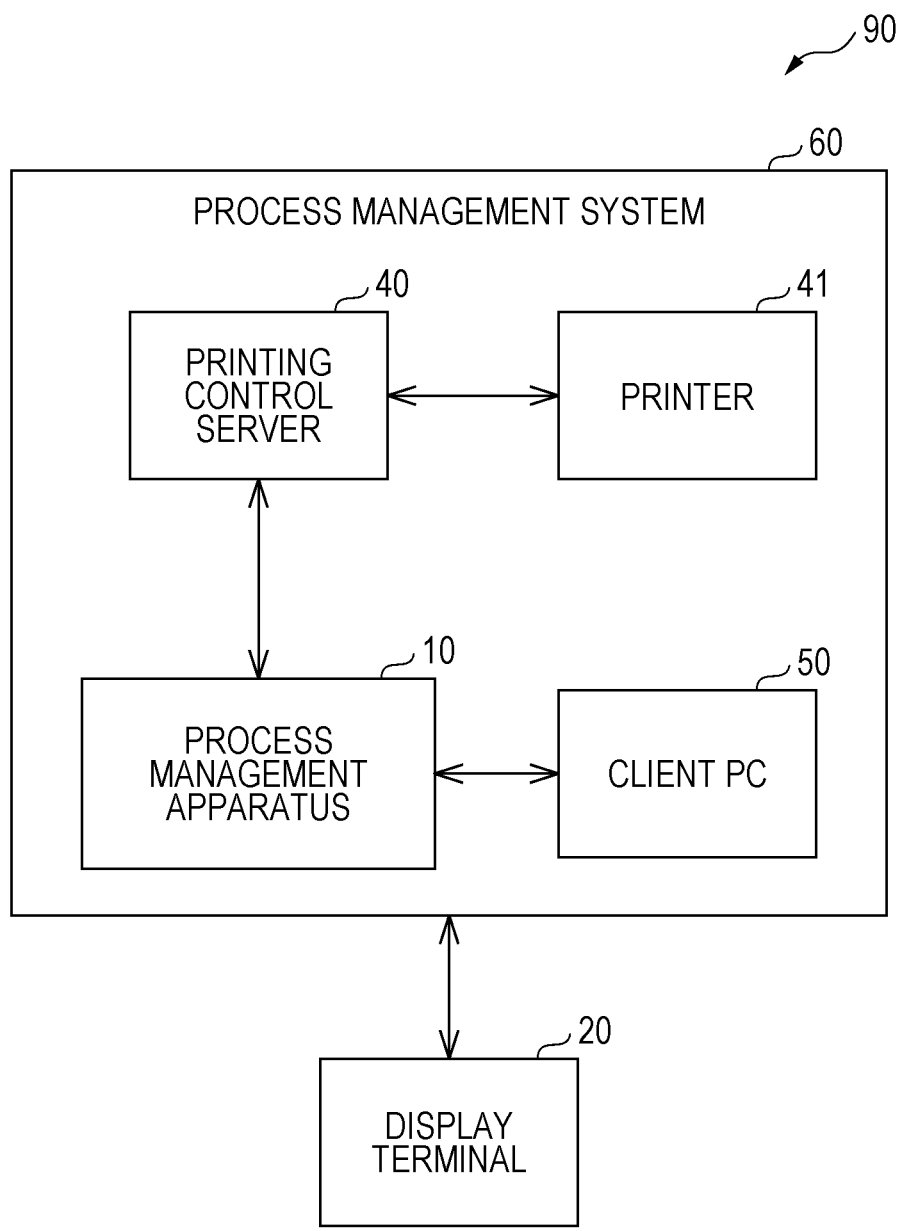
FIG. 1 is a diagram illustrating an example configuration of a process display system according to a first exemplary embodiment.

FIG. 1 is a diagram illustrating an example configuration of a process display system 90 according to a first exemplary embodiment.

As illustrated in FIG. 1, the process display system 90 according to this exemplary embodiment includes a process management system 60 and a display terminal 20. The process management system 60 includes a process management apparatus 10, a printing control server 40, a printer 41, and a client PC 50. The process management system 60 has the process management apparatus 10 as a cloud server and provides a process management service to a user of the client PC 50 with a cloud system. However, the process management service is not limited to a cloud service and may be an on-premise service. This exemplary embodiment is described by taking a printing process as an example of a process to be managed. The term "printing process" herein denotes a process from the production of a printed material to shipping, specifically, a process including receiving an order, printing, post-processing (cutting, gluing, attaching a book band and a book jacket, and the like in bookbinding), packaging, and shipping. However, the process to be managed is not limited to the printing process and also applies to a production process for producing a predetermined product in a factory.

A general computer such as a server computer or a PC applies to the process management apparatus 10. The process management apparatus 10 is connected to the printing control server 40 through wired communication or wireless communication. The process management apparatus 10 transmits printing control information for controlling the printing process to the printing control server 40 on the basis of information regarding an order from a customer.

The printing control server 40 is connected to the printer 41 through wired communication or wireless communication. Multiple printers 41 may be provided. The printer 41 performs printing in accordance with the printing control information received from the printing control server 40. Paper used for printing by the printer 41 may be, for example, continuous paper such as rolled paper or cut paper that is in advance cut in a predetermined size.

The printing control server 40 may be connected to a post-processing device (not illustrated) through wired communication or wireless communication. Multiple post-processing devices may be provided. The post-processing device executes the post-processing in accordance with post-processing control information received from the printing control server 40. Examples of the post-processing include processing of varnishing or the like of the printed surface of a printed material (hereinafter, also referred to as a sheet) printed in the printing process to prevent a flaw and dirt adhesion, processing for a booklet by collating and folding sheets of the body of a book in the order of pages and attaching a cover, finishing by removing a margin of a bookbound booklet to have a predetermined size, and the like.

The process management apparatus 10 manages the printing process. The process management apparatus 10 manages, for example, the progress state of a job, the state of an apparatus during the job, and the content of the job on the basis of information notified from a worker for the printing process and from the printing control server 40 via the client PC 50. An apparatus herein includes the printer 41, the post-processing device (not illustrated), and other apparatuses.

The process management apparatus 10 is connected to the display terminal 20 through wired communication or wireless communication. For example, a wireless local area network (LAN) such as Wi-Fi (registered trademark), short distance wireless communication such as near field communication (NFC), and infrared communication apply to the wireless communication. The process management apparatus 10 transmits process information that is information regarding the printing process in response to an acquisition request from the display terminal 20. The process information is information needed for managing the printing process and is to be displayed on the display terminal 20. The process information includes at least one of, for example, job progress information indicating the progress of a job in the process, apparatus information indicating the state of an apparatus used for the job in the process, and job list information indicating a list of pieces of content of respective jobs in the process. The process information is not limited to the information regarding a job in the process and includes attribute information common to all of jobs in the process and the like. Examples of the attribute information include information indicating a person in charge of the process, the information indicating the dead line for the process, and the like.

The display terminal 20 is a terminal used by an operator who monitors the printing process and is, for example, a head mounted terminal apparatus such as a MR device, a VR device, and an AR device. In this case, there are various shapes of the display terminal 20, for example, like eyeglasses and a cap. However, the shape thereof is not particularly limited. The display terminal 20 displays the process information received from the process management apparatus 10. The use of the head mounted display terminal 20 is desirable because the operator may check the process information while working with their hands. Note that the display terminal 20 is not limited to the head mounted terminal apparatus and may apply to a portable terminal apparatus such as a smartphone or a tablet terminal. The display terminal 20 is able to communicate with each of the printing control server 40, the printer 41, and the client PC 50 that are included in the process management system 60.

Figure 2:
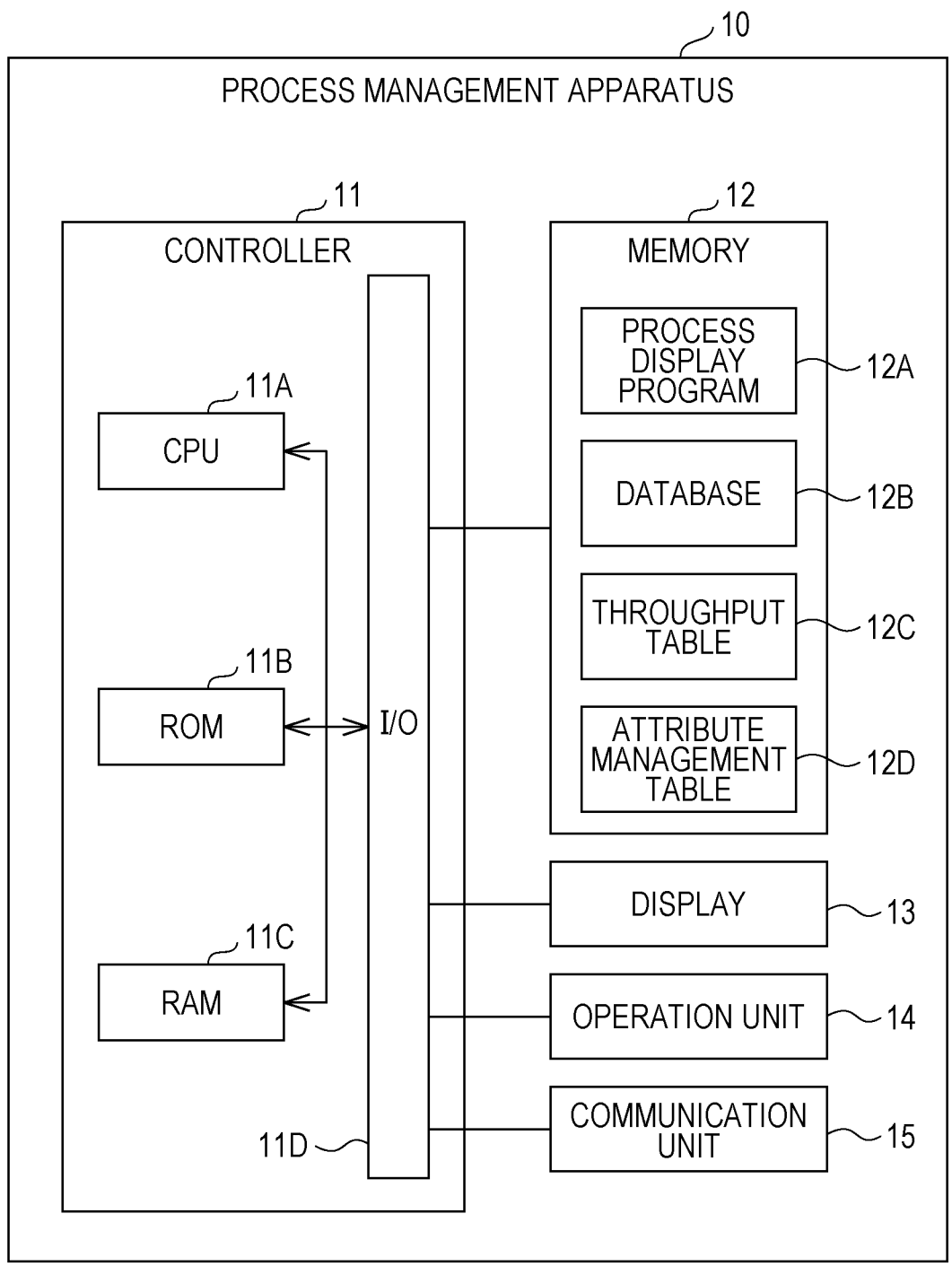
FIG. 2 is a block diagram illustrating an example electrical configuration of a process management apparatus according to the first exemplary embodiment.

FIG. 2 is a block diagram illustrating an example electrical configuration of the process management apparatus 10 according to the first exemplary embodiment.

As illustrated in FIG. 2, the process management apparatus 10 according to this exemplary embodiment includes a controller 11, a memory 12, a display 13, an operation unit 14, and a communication unit 15.

The controller 11 includes a central processing unit (CPU) 11A, a read only memory (ROM) 11B, a random access memory (RAM) 11C, and an input/output interface (I/O) 11D, and these units are connected to each other via a bus.

Functional units including the memory 12, the display 13, the operation unit 14, and the communication unit 15 are connected to the I/O 11D. These functional units are able to mutually communicate with the CPU 11A via the I/O 11D.

The controller 11 may be configured as a sub-controller that controls part of the operation of the process management apparatus 10 or may be configured as part of a main controller that controls the overall operation of the process management apparatus 10. For example, an integrated circuit (IC) using, for example, large scale integration (LSI) technology or an IC chipset is used for part or all of the blocks of the controller 11. Circuits may be used for the respective blocks, or a circuit having part or all of the blocks integrated thereinto may be used. The blocks may be integrated into one, or some blocks may be provided separately. In addition, part of each block may be provided separately. For the integration of the controller 11, not only the LSI technology but also a dedicated circuit or a general-purpose processor may be used.

As the memory 12, for example, a hard disk drive (HDD), a solid state drive (SSD), or a flash memory is used. The memory 12 stores a process display program 12A for implementing a process displaying function according to this exemplary embodiment. The process display program 12A may also be stored in the ROM 11B. The memory 12 also stores a database 12B, a throughput table 12C, and an attribute management table 12D. The database 12B may be provided outside the process management apparatus 10. The database 12B stores the process information described above.

The process display program 12A may be installed in advance, for example, on the process management apparatus 10. The process display program 12A may be implemented in such a manner as to be stored in a nonvolatile non-transitory storage medium or distributed through a network and then to be installed appropriately on the process management apparatus 10. As an example of the nonvolatile non-transitory storage medium, a compact disc read only memory (CD-ROM), a magneto-optical disk, a HDD, a digital versatile disc read only memory (DVD-ROM), a flash memory, a memory card, or the like is conceivable.

As the display 13, for example, a liquid crystal display (LCD), an organic electro luminescence (EL) display, or the like is used. The display 13 may have a touch panel integrated thereinto. The operation unit 14 is provided with a device for operation input such as a keyboard or a mouse.

The communication unit 15 is connected to a network such as the Internet, a LAN, or a wide area network (WAN) and is able to communicate with each of the printing control server 40, the display terminal 20, and the client PC 50 via the network. The communication via the network may be wired communication or wireless communication.

As described above, a display terminal updates process information regarding a process in synchronization of the acquisition of information regardless of whether the information is changed. However, display terminals have limited resources in comparison with general PCs, and some display terminals operate slowly when display is updated. Accordingly, updating information display on each display terminal every time the information is changed makes it difficult to manage the process smoothly. Note that an operation for updating the display includes not only the updating operation but also operations accompanying the update such as update data processing and displayed image generation.

The CPU 11A of the process management apparatus 10 according to this exemplary embodiment loads the process display program 12A stored in the memory 12 into the RAM 11C and runs the process display program 12A, thereby functioning as below. The CPU 11A is an example of a processor and an example of a second processor.

The CPU 11A performs control of whether to update the display of the process information, on the basis of the change level of the process information to be displayed by the display terminal 20. The process information is stored in the database 12B and updated every time the process information is changed. In this case, a change in the process information involves, for example, a change flag provided to a changed part of the process information to identify the changed part.

As described above, the process information includes at least one of, for example, the job progress information, the apparatus information, and the job list information. The job progress information is information indicating whether a job progresses as scheduled. The job progress information regarding a job α is, for example, "The job α is behind the job schedule". The change in the job progress information includes, for example, a change in the number of jobs behind schedule and a change in the content of the job. As a specific example of the change in the number of jobs behind schedule, change from "Job α is behind schedule" to "Jobs α and β are behind schedule" is cited. As a specific example of the change in the content of the job, a change from "Jobs α and β are behind schedule" to "Jobs α and γ are behind schedule" or the like is cited.

The apparatus information is information including a type and a message on a per-apparatus basis. Examples of the type include INFO (report), WARNING, ERROR, and the like. As the multiple messages including "Drier temperature has not been raised", "Sheet is short", "Printing is complete", and the like are defined. Apparatus information regarding an apparatus a is, for example, "ERROR: Sheet is short". Examples of the change in the apparatus information include a change resulting from multiple messages of the same type generated for a certain apparatus and a change resulting from messages of multiple types generated for a certain apparatus. As a specific example of the multiple messages of the same type generated for a certain apparatus, a change from "☐INFO: XX☐ occurs on apparatus a" to "☐INFO: AA☐ and ☐INFO: BB☐ occur on apparatus a" or the like is cited. As a specific example of the messages of multiple types generated for a certain apparatus, a change from "☐ERROR: xx☐ occurs on apparatus b" to "☐ERROR: xx☐ and ☐WARNING: CC☐ occur on apparatus b" or the like is cited.

The job list information is information indicating a list of pieces of content of the respective jobs. The job list information is, for example, "job α: complete", "job β: complete", and "job γ: in operation". A change in the job list information includes, for example, a change resulting from the completion of a job and a change resulting from the addition of a job. A specific example of the change resulting from the completion of a job, a change from "job α: complete", "job β: complete", and "job γ: in operation" to "job α: complete", "job β: complete", and "job γ: complete" or the like is cited. A specific example of the change resulting from the addition of a job, a change from "job α: complete", "job β: complete", and "job γ: in operation" to "job α: complete", "job β: complete", "job γ: complete", and "job ζ: added" or the like is cited.

In addition, as described above, the process information includes, as information regarding the attribute of the process, information indicating a person in charge of the process, information indicating the dead line of the process, and the like. Accordingly, the change in the process information includes a change of a person in charge, a change of a dead line, and the like.

Specifically, the CPU 11A performs control to receive, from the display terminal 20, a request for acquiring the process information to be displayed by the display terminal 20. The acquisition request may be transmitted in such a manner that a predetermined operation button on the display terminal 20 is pressed or may be automatically transmitted at regular intervals from the display terminal 20.

The CPU 11A acquires process information for the acquisition request from the database 12B. If the change level of the acquired process information is higher than or equal to a predetermined level, the CPU 11A performs control to transmit, to the display terminal 20, an update instruction including changed process information. In contrast, if the change level of the acquired process information is lower than the predetermined level, the CPU 11A performs control to transmit, to the display terminal 20, information indicating that the display of the process information is not to be updated. In this exemplary embodiment, the update instruction including the changed process information is transmitted from the process management apparatus 10 in response to the acquisition request from the display terminal 20; however, the exemplary embodiment is not limited to this. For example, the CPU 11A may judge the change level of the process information every time the process information is changed by the process management apparatus 10 or at regular intervals. If the change level is higher than or equal to the predetermined level, the CPU 11A may transmit the update instruction including the changed process information. If the change level is lower than the predetermined level, the CPU 11A may transmit the information indicating that the display of the process information is not to be updated. Alternatively, since the display is not updated, the CPU 11A may neglect transmitting the information.

In an example, if the process information is changed, the change level of the process information is judged to be higher than or equal to the predetermined level. If the process information is not changed, the change level of the process information is judged to be lower than the predetermined level. Specifically, if the process information is changed, the CPU 11A transmits, to the display terminal 20, the update instruction including the changed process information. The CPU 11A thereby performs the control to update the display of the process information on the display terminal 20. In contrast, if the process information is not changed, the CPU 11A transmits, to the display terminal 20, the information indicating that the display of the process information is not to be updated. The CPU 11A thereby performs the control not to update the display of the process information on the display terminal 20.

In addition, if specific information included in the process information is changed, the change level of the process information may be judged to be higher than or equal to the predetermined level. If the specific information included in the process information is not changed, the change level may be judged to be lower than the predetermined level. In an example, the specific information is herein information of import in the process management and appropriately set by an operator. In this case, for example, if information not of import other than the specific information is changed, the control not to update the display of the process information is performed.

If the number of changed parts in the process information is higher than or equal to a predetermined number (for example, 2), the change level of the process information may be judged to be higher than or equal to the predetermined level. If the number of changed parts in the process information is lower than the predetermined number, the change level may be judged to be lower than the predetermined level.

The process information includes information regarding any one of an apparatus and a material that are used in the process or information regarding a job performed in the process. In this case, if information indicating the status of an apparatus or a job is newly added, or if the content of a change in information indicating the status of an apparatus or a job satisfies a predetermined condition, the change level of the process information may be judged to be higher than or equal to the predetermined level. The predetermined condition is herein, for example, a condition in which the content of the change in the status is of import or the like and is appropriately set by the operator.

If the change level of the process information for the acquisition request is higher than or equal to the predetermined level, the CPU 11A may determine which one of the process management apparatus 10 and the display terminal 20 generates the screen information including the changed process information on the basis of the throughput of the display terminal 20. Note that in such a case where the image of a component (such as a toner cartridge) of the printer 41 and the process information are combined and displayed, the screen information includes the image of the component of the printer 41. In addition, the throughput of the display terminal 20 may be judged, for example, by using the throughput table 12C illustrated in FIG. 3.

Figure 3:
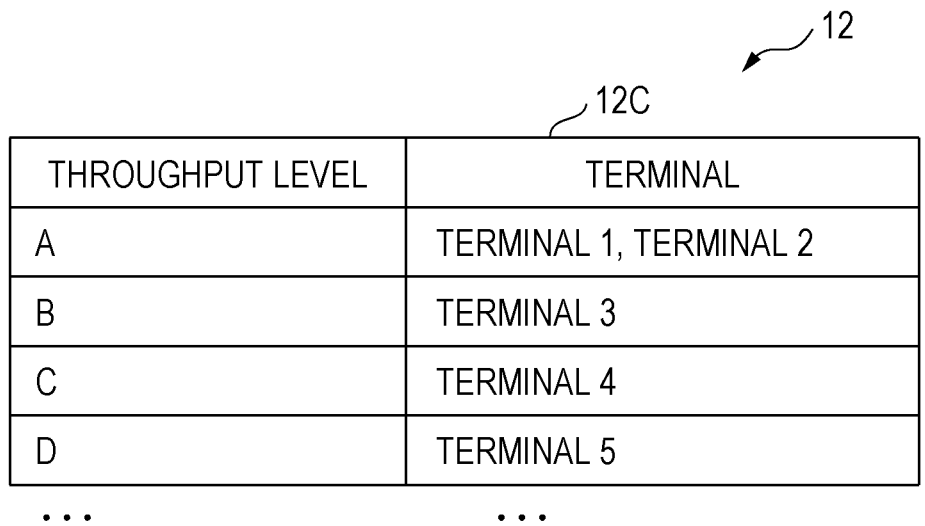
FIG. 3 is a table illustrating an example of a throughput table according to the first exemplary embodiment.

FIG. 3 is a table illustrating an example of the throughput table 12C according to this exemplary embodiment.

The throughput table 12C illustrated in FIG. 3 has throughput of the display terminal 20 registered on a per-level basis. The term "throughput" herein denotes, for example, the performance of a CPU (such as a clock frequency). Specifically, the display terminal 20 assigned Level A represents the terminal having the highest throughput, and the display terminal 20 assigned Level D represents the terminal having the lowest throughput. In the example in FIG. 3, there are terminals 1 to 5 as the display terminals 20. The terminals 1 and 2 are the terminals having the highest throughput, and the terminal 5 is the terminal having the lowest throughput. The registration of the terminals in the throughput table 12C may be performed appropriately, for example, by the operator.

The CPU 11A refers to the throughput table 12C of in FIG. 3. If the throughput of the display terminal 20 is higher than or equal to a predetermined level (for example, Level B), CPU 11A determines that the display terminal 20 generates the screen information. In contrast, if the throughput of the display terminal 20 is lower than the predetermined level (for example, Level B), the CPU 11A determines that the process management apparatus 10 generates the screen information.

To perform the control of whether to update the display of the process information on the display terminal 20, the CPU 11A may determine, on the basis of the attribute information of the display terminal 20, which one of the process management apparatus 10 and the display terminal 20 judges the change level of the process information for the acquisition request. The attribute information of the display terminal 20 is managed, for example, by using the attribute management table 12D illustrated in FIG. 4.

Figure 4:
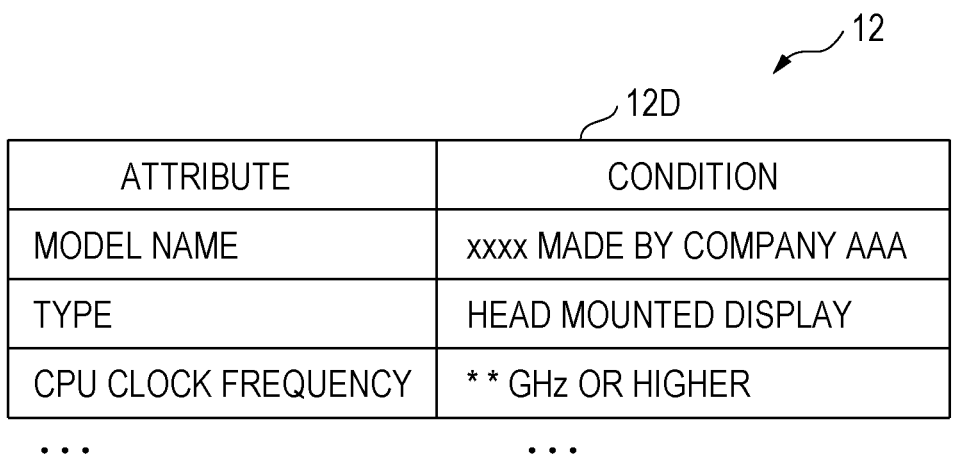
FIG. 4 is a table illustrating an example of an attribute management table according to the first exemplary embodiment.

FIG. 4 is a table illustrating an example of the attribute management table 12D according to this exemplary embodiment.

In the attribute management table 12D illustrated in FIG. 4, attributes indicated by the attribute information of the display terminal 20 are registered in association with a predetermined condition. The predetermined condition represents a condition for determining that the display terminal 20 judges the change level of the process information. In the example in FIG. 4, if the model name of the display terminal 20 is xxxxx made by Company AAA, it is determined that the display terminal 20 judges the change level. If the type of the display terminal 20 (such as a head mounted display, a smartphone, or a tablet terminal) is a head mounted display, it is determined that the display terminal 20 judges the change level. If the CPU clock frequency of that is an example of the throughput of the display terminal 20 is higher than or equal to *.* GHz, it is determined that the display terminal 20 judges the change level. Note that, for example, the operator may register each attribute and each condition appropriately.

In other words, if the attribute information of the display terminal 20 does not satisfy the predetermined condition, the CPU 11A determines that the process management apparatus 10 judges the change level. In this case, if the change level of the process information for the acquisition request is higher than or equal to the predetermined level, the CPU 11A transmits, to the display terminal 20, an update instruction including the changed process information. If the change level of the process information for the acquisition request is lower than the predetermined level, the CPU 11A performs the control to transmit, to the display terminal 20, the information indicating that the display of the process information is not to be updated.

In contrast, if the attribute information of the display terminal 20 satisfies the predetermined condition, the CPU 11A determines that the display terminal 20 judges the change level. In this case, the CPU 11A transmits the process information for the acquisition request to the display terminal 20 and instructs the display terminal 20 to judge the change level.

As described above, the following method may be used. For example, whether the model name of the display terminal 20, the type of the display terminal 20, and the throughput of the display terminal 20 such as a CPU clock frequency satisfy respective predetermined conditions is judged. If at least one of the judged model, the type, and the throughput satisfies the corresponding predetermined condition, the CPU of the display terminal 20 performs processing. If not, the CPU of the process management apparatus 10 performs the processing.

In this exemplary embodiment, the process management apparatus 10 communicates with the display terminal 20 and thereby determines whether to update the display on the display terminal 20; however, the exemplary embodiment is not limited to this mode. For example, the printing control server 40, the printer 41, or the client PC 50 included in the process management system 60 may communicate with the display terminal 20 and thereby determine whether to update the display on the display terminal 20.

The actions of the process management apparatus 10 according to the first exemplary embodiment will be described with reference to FIG. 5.

Figure 5:
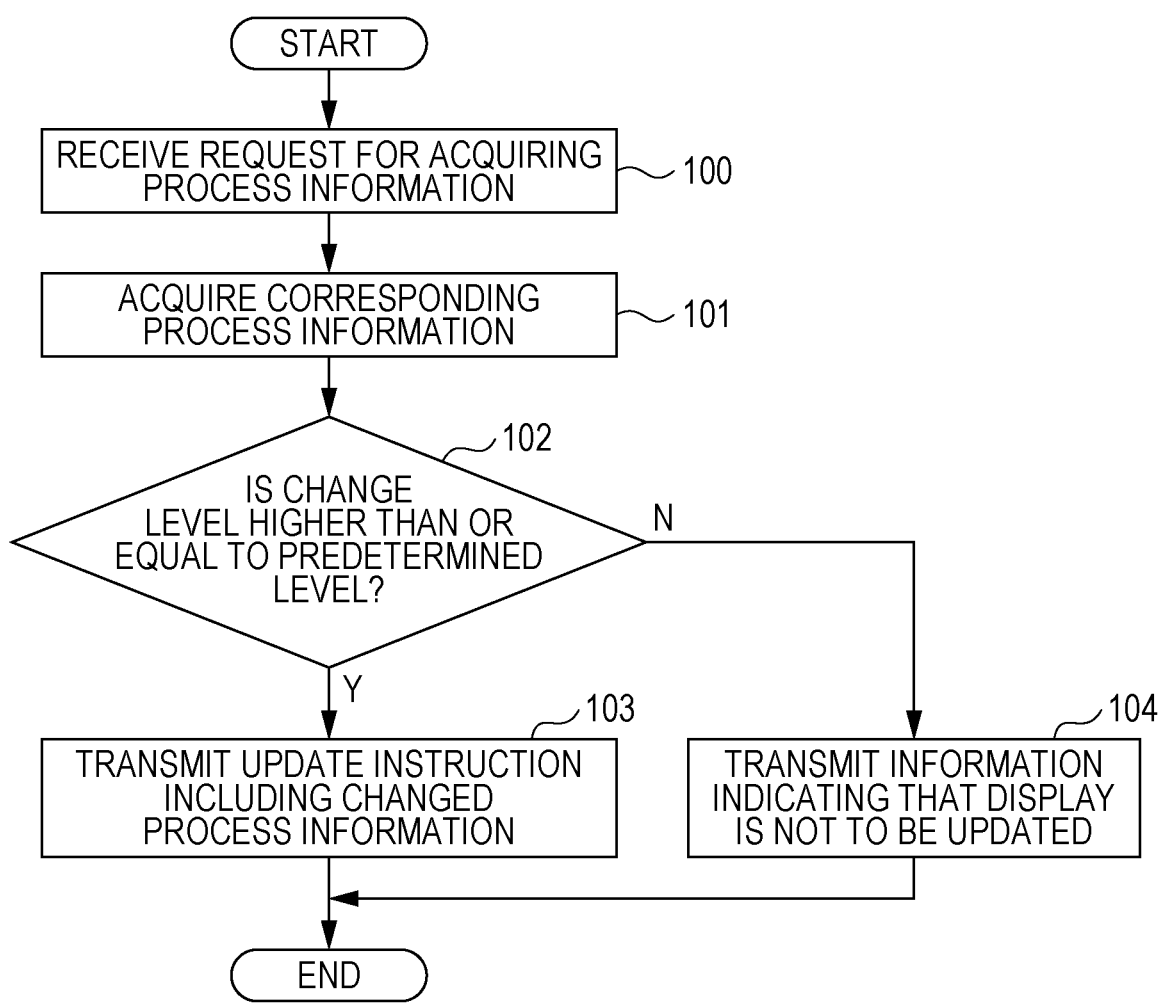
FIG. 5 is a flowchart illustrating an example flow of processing performed in accordance with a process display program according to the first exemplary embodiment.

FIG. 5 is a flowchart illustrating an example flow of processing performed in accordance with the process display program 12A according to the first exemplary embodiment.

First, after the process management apparatus 10 is started by switching on, the process display program 12A is started, and the following steps are performed.

In step 100 in FIG. 5, the CPU 11A performs control to receive, from the display terminal 20, a request for acquiring process information to be displayed by the display terminal 20. As described above, the acquisition request may be transmitted in such a manner that the predetermined operation button on the display terminal 20 is pressed or may be automatically transmitted at regular intervals from the display terminal 20.

In step 101, the CPU 11A acquires, from the database 12B, the process information for the acquisition request received in step 100.

In step 102, the CPU 11A judges whether the change level of the process information acquired in step 101 is higher than or equal to the predetermined level. If the CPU 11A judges that the change level of the process information is higher than or equal to the predetermined level (affirmative judgment), the processing moves to step 103. If the CPU 11A judges that the change level of the process information is lower than the predetermined level (negative judgment), the processing moves to step 104. For example, if the process information is changed, the CPU 11A judges that the change level is higher than or equal to the predetermined level. If the process information is not changed, the CPU 11A judges that the change level is lower than the predetermined level.

In step 103, the CPU 11A performs the control to transmit the update instruction including the changed process information to the display terminal 20 and then terminates the series of steps by the process display program 12A.

In contrast, in step 104, the CPU 11A performs the control to transmit, to the display terminal 20, the information indicating that the display is not to be updated and then terminates the series of steps performed by the process display program 12A.

According to this exemplary embodiment as described above, the process management system 60 including the process management apparatus 10 mainly performs the processing and determines whether to update the display on the display terminal 20, on the basis of the change level of the process information. This reduces the number of times the display on the display terminal 20 is updated and thus enables smooth process management.

Second Exemplary Embodiment

In the description of the first exemplary embodiment above, the process management system 60 including the process management apparatus 10 mainly performs the processing, and the number of times the display on the display terminal 20 is updated is reduced. In contrast, in the description for a second exemplary embodiment, the display terminal 20 mainly performs the processing, and the number of times the display on the display terminal 20 is updated is reduced.

Figure 6:
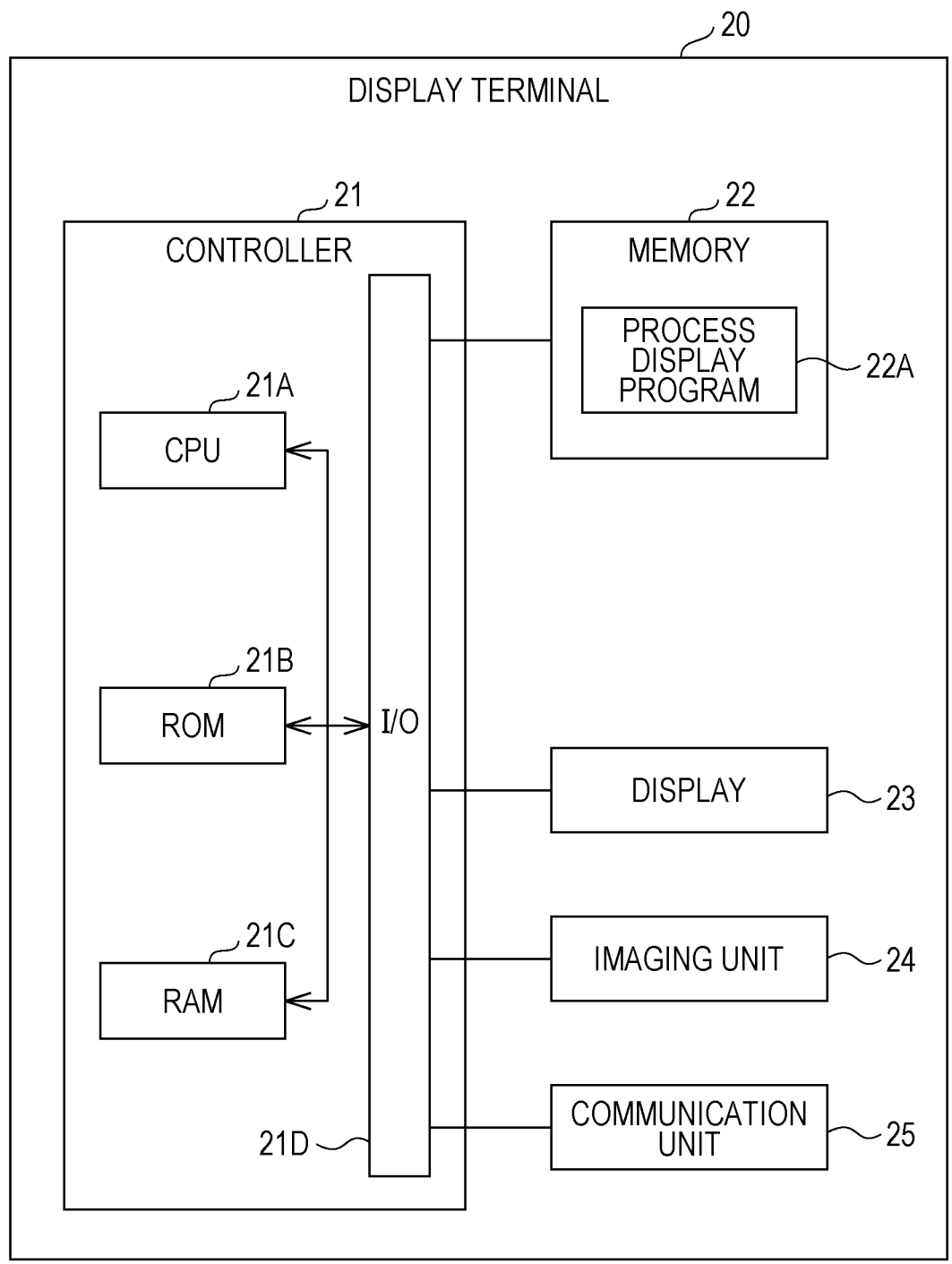
FIG. 6 is a block diagram illustrating an example electrical configuration of a display terminal according to a second exemplary embodiment.

FIG. 6 is a block diagram illustrating an example electrical configuration of the display terminal 20 according to the second exemplary embodiment. FIG. 6 illustrates an MR device that applies to the display terminal 20. However, as described above, a VR device or an AR device may be applied.

As illustrated in FIG. 6, the display terminal 20 according to this exemplary embodiment includes a controller 21, a memory 22, a display 23, an imaging unit 24, and a communication unit 25.

The controller 21 includes a CPU 21A, a ROM 21B, a RAM 21C, and an I/O 21D, and these units are connected to each other via a bus.

Functional units including the memory 22, the display 23, the imaging unit 24, and the communication unit 25 are connected to the I/O 21D. These functional units are able to mutually communicate with the CPU 21A via the I/O 21D.

The controller 21 may be configured as a sub-controller that controls part of the operation of the display terminal 20 or may be configured as part of a main controller that controls the overall operation of the display terminal 20.

As the memory 22, for example, a flash memory is used. The memory 22 stores a process display program 22A for implementing a process displaying function according to this exemplary embodiment. The process display program 22A may also be stored in the ROM 21B.

The process display program 22A may be installed in advance, for example, on the display terminal 20. The process display program 22A may be implemented in such a manner as to be stored in a nonvolatile non-transitory storage medium or distributed through a network and then to be installed appropriately. As an example of the nonvolatile non-transitory storage medium, a CD-ROM, a magneto-optical disk, a HDD, a DVD-ROM, a flash memory, a memory card, or the like is conceivable, as described above.

The display 23 displays a mixed reality image in the view of the operator wearing the display terminal 20. In the mixed reality image, the process information is superimposed on the real scene. The mixed reality image may be generated, for example, by the process management apparatus 10. The display 23 uses a display system such as an optical see-through system or a video see-through system. The optical see-through system displays a mixed reality image in which the process information is superimposed on the real scene displayed in a see-through manner. The video see-through system displays a mixed reality image in which the process information is superimposed on a real image obtained by capturing by the imaging unit 24.

The imaging unit 24 captures an image of the real scene and thereby acquires a real image and applies to, for example, a charge coupled device (CCD) camera, a complementary metal oxide semiconductor (CMOS) camera, or the like. The imaging unit 24 is provided in the display terminal 20 to enable an image of a subject in a direction of the line of sight of the operator wearing the display terminal 20 to be captured, desirably, such that the real scene looked by the operator and a real image obtained by capturing by the imaging unit 24 substantially match.

The communication unit 25 communicates with each of the process management apparatus 10, the printing control server 40, the printer 41, and the client PC 50 via the network. The communication via the network may be wired communication or wireless communication. For example, as described above, a wireless LAN such as Wi-Fi (registered trademark), short distance wireless communication such as NFC, and infrared communication apply to the wireless communication.

The CPU 21A of the display terminal 20 according to this exemplary embodiment loads the process display program 22A stored in the memory 22 into the RAM 21C and runs the process display program 22A, thereby functioning as below. The CPU 21A is an example of the processor and an example of a first processor.

The CPU 21A performs the control of whether to update the display of the process information on the basis of the change level of the process information to be displayed by the display terminal 20.

Specifically, the CPU 21A performs control to transmit a request for acquiring the process information to be displayed by the display terminal 20 to the process management apparatus 10 able to communicate with the display terminal 20. The CPU 21A performs control to receive, from the process management apparatus 10, the process information for the acquisition request. If the change level of the received process information is higher than or equal to a predetermined level, the CPU 21A performs control to update the display of the process information yet to be changed with the display of the changed process information. In contrast, if the change level of the received process information is lower than the predetermined level, the CPU 21A performs control not to update the display of the process information.

The exemplary embodiment is not limited to the mode in which the process information is received in response to the acquisition request as described above. For example, the process information may be received from the process management apparatus 10 at regular intervals or every time the process information is changed.

In the same manner as in the case of the process management apparatus 10, for example, the change level of the process information is judged to be higher than or equal to the predetermined level if the process information is changed, and the change level is judged to be lower than the predetermined level if the process information is not changed. Specifically, if the process information is changed, the CPU 21A performs the control to update the display of the process information yet to be changed with the display of the changed process information. In contrast, if the process information is not changed, the CPU 21A performs the control not to update the display of the process information.

If specific information included in the process information is changed, the change level of the process information may be judged to be higher than or equal to the predetermined level. If the specific information included in the process information is not changed, the change level may be judged to be lower than the predetermined level. In an example, the specific information is herein information of import in the process management and appropriately set by an operator. In this case, for example, if information not of import other than the specific information is changed, the control not to update the display of the process information is performed.

If the number of changed parts in the process information is higher than or equal to a predetermined number (for example, 2), the change level of the process information may be judged to be higher than or equal to the predetermined level. If the number of changed parts in the process information is lower than the predetermined number, the change level may be judged to be lower than the predetermined level.

If information indicating the status of an apparatus or a job is newly added, or if the content of a change in information indicating the status of an apparatus or a job satisfies a predetermined condition, the change level of the process information may be judged to be higher than or equal to the predetermined level.

In this exemplary embodiment, the display terminal 20 communicates with the process management apparatus 10 and thereby determines whether to update the display on the display terminal 20; however, the exemplary embodiment is not limited to this mode. For example, the display terminal 20 may communicate with the printing control server 40, the printer 41, or the client PC 50 included in the process management system 60 and thereby determine whether to update the display on the display terminal 20.

The actions of the display terminal 20 according to the second exemplary embodiment will be described with reference to FIG. 7.

FIG. 7 is a flowchart illustrating an example flow of processing performed in accordance with the process display program 22A according to the second exemplary embodiment.

First, after the display terminal 20 is started by switching on, the process display program 22A is started, and the following steps are performed.

In step 110 in FIG. 7, the CPU 21A receives selection of process information to be displayed by the display terminal 20.

In step 111, the CPU 21A performs control to transmit, to the process management apparatus 10, a request for acquiring the process information selection of which is received in step 110. As described above, the acquisition request may be transmitted in such a manner that the predetermined operation button on the display terminal 20 is pressed or may be automatically transmitted at regular intervals from the display terminal 20.

In step 112, the CPU 21A judges whether the process information is received from the process management apparatus 10 in response to the acquisition request transmitted in step 111. If the CPU 21A judges that the process information is received from the process management apparatus 10 (affirmative judgment), the processing moves to step 113. If the CPU 21A judges that the process information is not received from the process management apparatus 10 (negative judgment), the processing waits in step 112.

In step 113, the CPU 21A judges whether the change level of the process information received in step 112 is higher than or equal to the predetermined level. If the CPU 21A judges that the change level of the process information is higher than or equal to the predetermined level (affirmative judgment), the processing moves to step 114. If the CPU 21A judges that the change level of the process information is lower than the predetermined level (negative judgment), the CPU 21A does not update the display of the process information, and terminates the series of steps performed in accordance with the process display program 22A. For example, the change level of the process information is judged to be higher than or equal to the predetermined level if the process information is changed, and the change level is judged to be lower than the predetermined level if the process information is not changed.

In step 114, the CPU 21A performs the control to update the display of the process information yet to be changed with the display of the changed process information and terminates the series of steps performed in accordance with the process display program 22A.

According to this exemplary embodiment as described above, the display terminal 20 mainly performs the processing and determines whether to update the display on the display terminal 20, on the basis of the change level of the process information. This reduces the number of times the display on the display terminal 20 is updated and thus enables smooth process management.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process display system, the process management apparatus, and the display terminal according to each exemplary embodiment have heretofore been illustrated and described. In a mode of the exemplary embodiment, the exemplary embodiment may be a program causing a computer to implement the functions of the components of the process display system, the process management apparatus, and the display terminal. The exemplary embodiment may be a non-transitory storage medium readable by the computer storing the program.

The configuration of each of the process display system, the process management apparatus, and the display terminal described for the exemplary embodiment above is an example and may be modified in accordance with the circumstances without departing from the spirit of the exemplary embodiment.

The flow of the processing performed in accordance with the program described for the aforementioned exemplary embodiment is also an example. A deletion of an unnecessary step, an addition of a new step, a change of the order of the steps, and the like may be performed without departing from the spirit of the exemplary embodiment.

The case where the program is run and thereby the processing according to the exemplary embodiment is implemented by using the computer and the software configuration therefore has heretofore been described for the exemplary embodiment above; however, the exemplary embodiment is not limited to this case. The exemplary embodiment may be implemented by, for example, a hardware configuration and combination of the hardware configuration and the software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A process display system comprising:
a display terminal including a first processor; and
a process management system that includes a second processor and that communicates with the display terminal,
wherein the process display system determines that the first processor judges a change level of the process information on the display terminal when the display terminal satisfies a predetermined attribute condition, and the process display system determines that the second processor judges the change level of the process information on the display terminal when the display terminal does not satisfy the predetermined attribute condition, the predetermined attribute condition relating to at least one of a model name, a type of display terminal, and a throughput, and wherein the determined one of the first processor or the second processor performs control of whether to update display of process information regarding a process, the process information being displayed by the display terminal, and the control being performed on a basis of a change level of the process information on the display terminal, the change level including at least one of a change of a person in charge and a change of a deadline.

2. The process display system according to claim 1, wherein if the process information is changed, and in at least one of cases where specific information included in the process information and where a number of changed parts in the process information is larger than or equal to a predetermined number, the first processor or the second processor judges that the change level of the process information is higher than or equal to a predetermined level.

3. The process display system according to claim 2, wherein in performing the control of whether to update the display of the process information on the display terminal, the second processor performs control to transmit an update instruction including the changed process information to the display terminal if the change level of the process information is higher than or equal to the predetermined level, and the second processor performs control to transmit, to the display terminal, information indicating that the display of the process information is not to be updated if the change level of the process information is lower than the predetermined level.

4. The process display system according to claim 3, wherein if the change level of the process information is higher than or equal to the predetermined level, the second processor determines, on a basis of throughput of the display terminal, which one of the process display system and the display terminal generates screen information including the changed process information.

5. The process display system according to claim 3, wherein the process information includes at least one of job progress information indicating progress of a job in the process, apparatus information indicating a state of an apparatus used for the job in the process, and job list information indicating a list of content of the job in the process.

6. The process display system according to claim 2, wherein if the change level of the process information is higher than or equal to the predetermined level, the second processor performs control to transmit an update instruction including the changed process information to the display terminal, and if the change level of the process information is lower than the predetermined level, the second processor performs control to transmit, to the display terminal, information indicating that the display of the process information is not to be updated.

7. The process display system according to claim 6, wherein if the predetermined attribute condition of the display terminal satisfies the predetermined condition, the second processor determines that the display terminal judges the change level, transmits the process information to the display terminal, and instructs the display terminal to judge the change level.

8. The process display system according to claim 2, wherein in performing the control of whether to update the display of the process information displayed by the display terminal, the first processor performs control to receive the process information from the process management system, performs control to update the display of the process information yet to be changed on the display terminal with display of the changed process information if the change level of the received process information is higher than or equal to the predetermined level, and performs control not to update the display of the process information on the display terminal if the change level of the received process information is lower than the predetermined level.

9. The process display system according to claim 2, wherein the process information includes at least one of job progress information indicating progress of a job in the process, apparatus information indicating a state of an apparatus used for the job in the process, and job list information indicating a list of content of the job in the process.

10. The process display system according to claim 1, wherein the process information includes information regarding any one of an apparatus and a material that are used in the process or information regarding a job performed in the process, and wherein if information indicating a status of the apparatus or the job is newly added, or if content of a change in the information indicating the status of the apparatus or the job satisfies a predetermined condition, the first processor or the second processor judges that the change level of the process information is higher than or equal to a predetermined level.

11. The process display system according to claim 10, wherein in performing the control of whether to update the display of the process information on the display terminal, the second processor performs control to transmit an update instruction including changed process information to the display terminal if the change level of the process information is higher than or equal to the predetermined level, and the second processor performs control to transmit, to the display terminal, information indicating that the display of the process information is not to be updated if the change level of the process information is lower than the predetermined level.

12. The process display system according to claim 11, wherein if the change level of the process information is higher than or equal to the predetermined level, the second processor determines, on a basis of throughput of the display terminal, which one of the process display system and the display terminal generates screen information including the changed process information.

13. The process display system according to claim 10, wherein in performing the control of whether to update the display of the process information displayed by the display terminal, the first processor performs control to receive the process information from the process management system, performs control to update the display of the process information yet to be changed on the display terminal with display of changed process information if the change level of the received process information is higher than or equal to the predetermined level, and performs control not to update the display of the process information on the display terminal if the change level of the received process information is lower than the predetermined level.

14. The process display system according to claim 10, wherein the process information includes at least one of job progress information indicating progress of a job in the process, apparatus information indicating a state of an apparatus used for the job in the process, and job list information indicating a list of content of the job in the process.

15. The process display system according to claim 1, wherein the process information includes at least one of job progress information indicating progress of a job in the process, apparatus information indicating a state of an apparatus used for the job in the process, and job list information indicating a list of content of the job in the process.

16. The process display system according to claim 1, wherein the predetermined attribute condition relates to at least one of the model name, and the type of display terminal.

17. A non-transitory computer readable medium storing a program causing a computer to execute a process for process display, the process comprising:

determining that a first processor judges a change level of process information on a display terminal when the display terminal satisfies a predetermined attribute condition, and determining that a second processor judges the change level of the process information on the display terminal when the display terminal does not satisfy the predetermined attribute condition, the predetermined attribute condition relating to at least one of a model name, a type of display terminal, and a throughput; and performing control of whether to update display of process information regarding a process, the process information being displayed by the display terminal, the control being performed on a basis of a change level of the process information on the display terminal, the change level including at least one of a change of a person in charge and a change of a deadline.

* * * * *